F. H. PAGE.
CONNECTION FOR MEMBERS OF AIRCRAFT FRAMES.
APPLICATION FILED SEPT. 6, 1919.

1,328,963.

Patented Jan. 27, 1920.
2 SHEETS—SHEET 2.

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

CONNECTION FOR MEMBERS OF AIRCRAFT-FRAMES.

1,328,963.   Specification of Letters Patent.   Patented Jan. 27, 1920.

Application filed September 6, 1919. Serial No. 322,172.

*To all whom it may concern:*

Be it known that I, FREDERICK HANDLEY PAGE, a subject of the King of Great Britain, residing at London, England, have invented certain new and useful Improvements in Connections for Members of Aircraft-Frames, of which the following is a specification.

This invention relates to improvements in framework of aircraft and includes the construction of clips for attachment of struts at right angles to the longitudinal members and more particularly to a clip or fitting for connecting the struts to the longerons of the fuselage and also if desired for the attachment of tension wires.

In the connection of a strut to a longeron in the construction of a fuselage or the like box girder for an aircraft, taken by way of example, a metal clip is provided adapted to completely or partly encircle the longeron which clip receives the cap on the strut end requiring attachment to the said longeron and prevents the relative displacement of these parts.

Such a clip according to this invention is built up from a number of suitably shaped metal sections, each having outstanding flanges, the sections being secured together by riveting the flanges of one section to the flanges of its adjacent sections. These flanges receive slotted ends of struts and are also pierced to receive tension members.

A wedge shaped block is secured in the angle between two adjacent struts to prevent the slotted ends of said struts from spreading, and means for a like purpose, are provided on the outer edges of the end sections of the clip.

Figure 1:
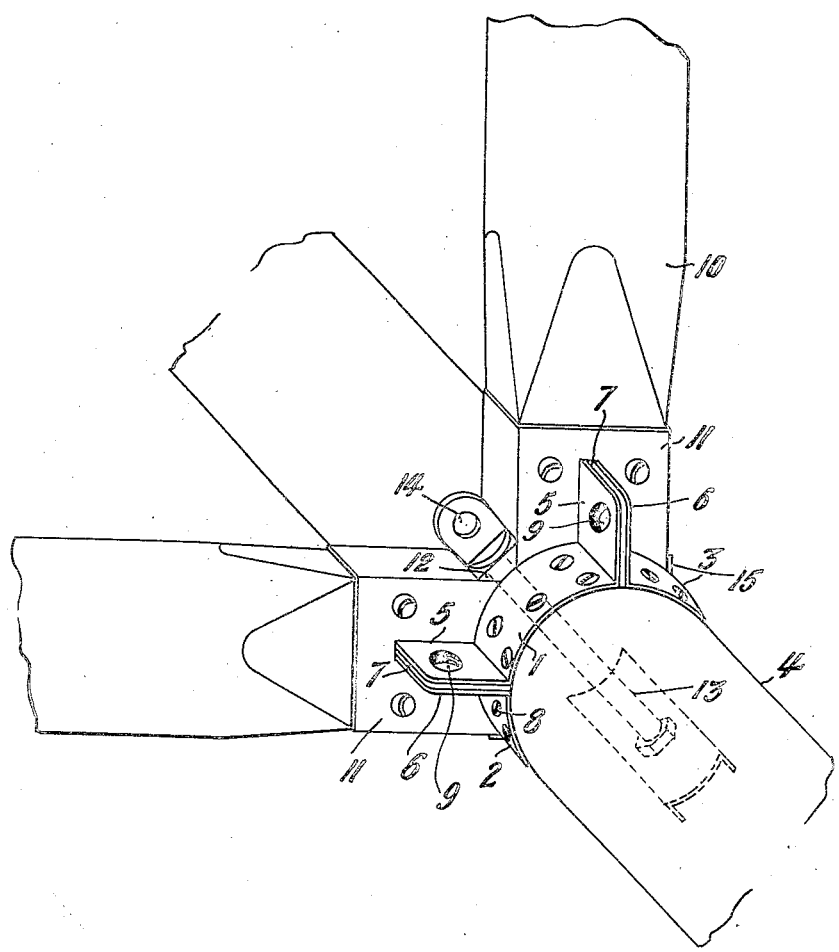
Figure 2:
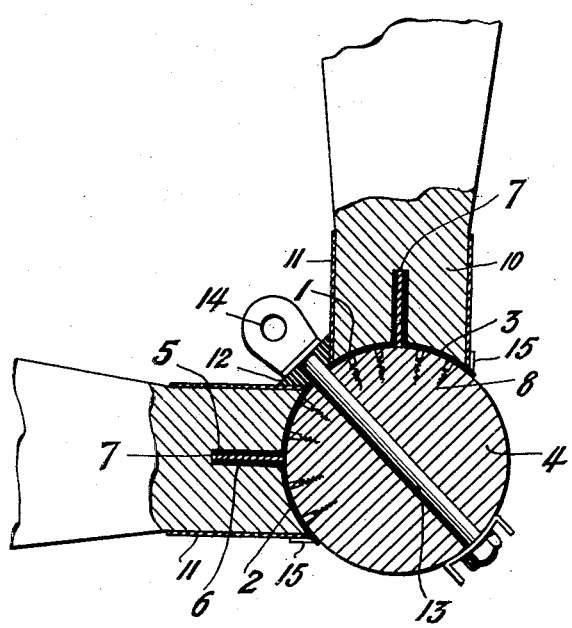
Figure 3:
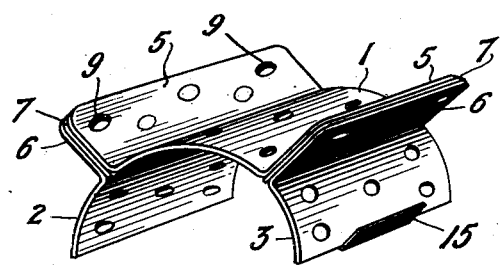

In the accompanying drawings Figure 1 is a perspective view showing struts connected to a longeron by means of a preferred form of clip or fitting constructed according to this invention; Fig. 2 is a transverse sectional view of the same; and Fig. 3 a perspective view of the clip adapted to partly surround a cylindrical spar or longeron.

In the example shown in the accompanying drawings, the clip comprises three segmental sections 1, 2 and 3 adapted to fit on to a longeron 4 of cylindrical cross section. The section 1 of the clip is formed with two outstanding flanges 5 and the sections 2 and 3 have each a similar flange 6.

When assembling the sections to form the clip the flanges 5 and 6 are riveted together having a strengthening plate 7 interposed between them. The clip may then be secured to the longeron 4 by screws 8 see Figs. 1 and 2. Holes 9 are formed through the flanges 5 and 6 and the interposed strengthening plates 7, to receive tensioning devices for bracing the structure.

When it is desired to connect the struts to the longeron they are brought into position upon the clip, and their slotted ends 10, preferably incased in metal caps 11, are set astride the pairs of outstanding flanges 5—6. In the angle between the struts a wedge shaped piece of aluminium or the like 12 is provided, held in position on the longeron 4 by a bolt 13 passing through the said longeron. This wedge shaped piece 12 serves to prevent any widening or spreading of the slotted ends of the struts, and the securing bolt 13 is provided with an eye 14 to receive a tension wire or like member.

Spreading of the slotted ends of the struts is also prevented by upturned portions 15 provided along the outer edges of the end sections of the clip.

It will be obvious that the number of sections comprised in a clip according to this invention may vary with the use to which it is to be applied, and to the shape of the member to which it is to be fitted.

The strengthening plates 7 may, in some cases be dispensed with, and the flanges of the sections riveted directly to the flanges of the adjoining section.

What I claim as my invention and desire to secure by Letters Patent is:—

1. A framework for aircraft having members provided with clips, formed of sections with outstanding flanges attached to each other, split ended struts straddling the said flanges and seating against the clip, a wedge shaped block seated upon the clip between the ends of adjacent struts, and a bolt passing through the framework and through the wedge shaped block provided with means for the attachment of tension members thereto.

2. A framework for aircraft having members provided with clips formed of sections with outstanding flanges attached to each other and having holes for receiving tension members, struts with split ends straddling the said flanges and seating against the body of the clip and means for preventing the split ends from spreading.

3. A framework for aircraft having members provided with clips formed of sections with outstanding flanges attached to each other and having holes for receiving tension members, split ended struts straddling the said flanges and seating against the clip, a wedge shaped block seated upon the clip between the ends of adjacent struts and a bolt passing through the framework and through the wedge shaped block provided with means for the attachment of tension members thereto.

In witness whereof I have hereunto set my hand in the presence of two witnesses.

FREDERICK HANDLEY PAGE.

Witnesses:
CYRIL GRIFFITH BREWER,
J. WATT.